United States Patent Office 3,041,794
Patented July 3, 1962

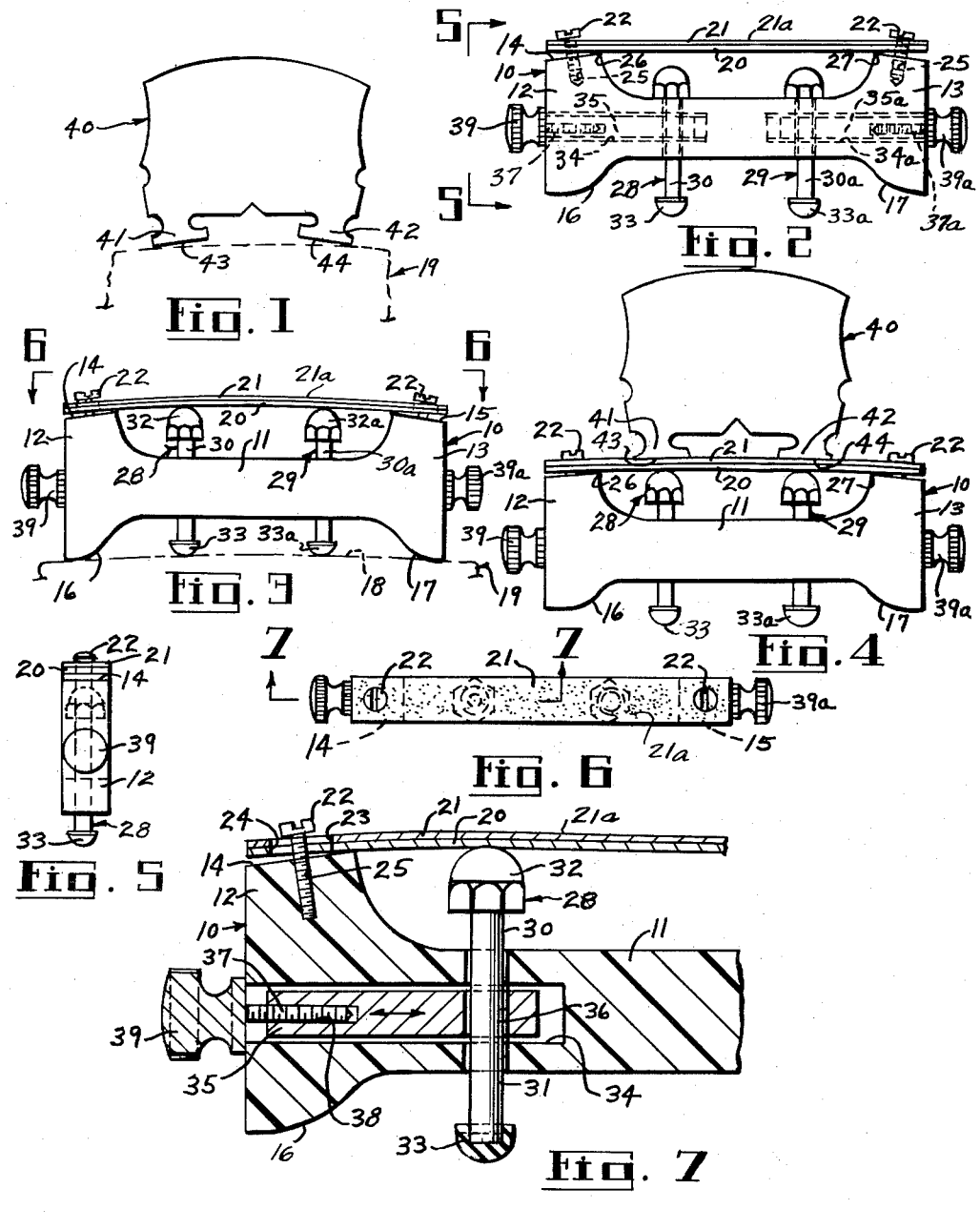

3,041,794
MUSICAL INSTRUMENT BRIDGE FITTER
Frank Saam, 11441 Coplin Ave., Detroit, Mich.
Filed Apr. 14, 1960, Ser. No. 22,274
4 Claims. (Cl. 51—185)

This invention relates generally to improvements in apparatus for repairing string instruments, and more particularly to a novel bridge fitter for shaping the feet of a bridge to the exact contour of the top of a string instrument.

Heretofore when fitting a new bridge to a string instrument it has been necessary to employ a number of steps to shape the feet of the bridge to the top contour of the instrument. The methods for accomplishing the fitting of an instrument bridge have been time consuming and costly. Accordingly, it is the primary object of this invention to provide an apparatus by means of which the user can easily and quickly fit a bridge to the exact contour of the top surface of an instrument.

It is another object of the present invention to provide an instrument bridge fitter which embodies a cross member having integral upwardly and downwardly extended legs on the ends thereof, and a resilient means mounted between the upper ends of the legs and adapted to be flexed to the contour of the top surface of an instrument by means of a plurality of gauge pins adjustably carried by the cross member. The resilient means is provided with a sanding grit on the outer upper surface thereof whereby the feet of a bridge may be sanded to the exact contour of an instrument by moving it over the sanding grit after the resilient means has been flexed to the contour of the top surface of the instrument.

It is a further object of the present invention to provide a bridge fitter for a string instrument which is simple and compact in construction, economical of manufacture and efficient in operation.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a side elevational view of a string instrument bridge in a condition prior to being fitted to the top contour of an instrument;

FIG. 2 is a side elevational view of a bridge fitter made in accordance with the principles of the present invention and showing it in an inoperative position;

FIG. 3 is a side elevational view of the bridge fitter shown in FIG. 2 and with the same being mounted on the contoured surface of an instrument for obtaining the contour thereof;

FIG. 4 is a side elevational view of a bridge fitter of the present invention and showing the same in an adjusted position with a bridge seated on the sanding grit on the curved resilient means for shaping the feet of the bridge;

FIG. 5 is a side elevational view of the structure illustrated in FIG. 2, taken along the line 5—5 thereof and looking in the direction of the arrows;

FIG. 6 is a top view of the structure illustrated in FIG. 3, taken along the line 6—6 thereof and looking in the direction of the arrows; and FIG. 7 is an enlarged fragmentary elevational sectional view of the structure illustrated in FIG. 6, taken along the line 7—7 thereof and looking in the direction of the arrows.

Referring now to the drawing and in particular to FIGS. 2 and 7, the bridge fitter of the present invention includes the body member generally indicated by the numeral 10. The body 10 comprises the cross piece or member 11 which is provided with the integral vertical legs 12 and 13 at the ends thereof. It will be seen that the legs 12 and 13 extend upwardly and downwardly relative to the cross member 11 and are provided with the flat outwardly tapered upper ends 14 and 15, respectively. The lower inner corners of the legs 12 and 13 are convexly or outwardly curved as indicated by the numerals 16 and 17, respectively, so as to provide an efficient seating contact with the curved top surface or contour 18 of a string instrument as indicated by the broken outline of an instrument 19.

A resilient means comprising the lower strip of spring steel 20 and the upper strip of spring steel 21 is mounted between the legs 12 and 13 by means of the screws 22. The upper surface 21a of the spring steel strip 21 is provided with a suitable sanding grit. The screws 22 are adapted to extend through the elongated holes 23 and 24 in the spring steel strips 21 and 20, respectively, and into the threaded holes 25 in the upper ends of the legs 12 and 13. As shown in FIG. 2, the steel strips 20 and 21 rest on the inner side corners 26 and 27 of the legs 12 and 13, respectively, when the bridge fitter is in the inoperative condition.

As best seen in FIGS. 2 and 7, a pair of laterally spaced apart vertical gauge rods 28 and 29 are slidably, adjustably mounted through the cross member 11. It will be seen that the gauge rods 28 and 29 are adapted to engage the contour of the top of an instrument with the lower ends thereof and the steel strips 20 and 21 with the upper ends thereof when the fitter is placed on an instrument, whereby the steel strips are flexed to the exact contour of the instrument. A locking means is provided for releasably securing the gauge rods in an adjusted position. The gauge rods 28 and 29 are constructed in the same manner and the gauge rod 28 will be described in detail and corresponding reference numerals followed by the small letter "a" will be used for marking the identical structure of the gauge rod 29.

As best seen in FIG. 7, the gauge rod 28 includes the rod 30 which is slidably mounted in the vertical hole 31 in the cross member 11. A nut 32 is threadably mounted on the top of the rod 30 and this nut is provided with a rounded head for engaging the lower side of the steel strip 20. A rounded rubber tip 33 is fixedly mounted by any suitable means on the lower end of the rod 30. The body 10 is provided with a horizontal hole which extends inwardly from the side thereof and into the cross member. The hole 34 intersects the vertical hole 31 as shown in FIG. 7. Slidably mounted in the circular hole 34 is the circular locking pin 35 which is provided with a vertical hole 36 through the inner end thereof. As shown in FIG. 7, the gauge rod 30 extends through the pin hole 36. A lock screw 37 is threadably mounted in the threaded hole 38 which is formed in the outer end of the pin 35. An enlarged integral thumb head is mounted on the outer end of the screw 37. The inner side of the thumb head 39 abuts the outer face of the leg 12. When the pin 35 is moved to the left as shown in FIG. 7 by means of the screw 37, the gauge rod 30 will be releasably secured in the desired adjusted position to hold the steel strips 20 and 21 in a flexed position.

In the use of the bridge fitter of the present invention the knurled brass thumb heads of the side locking screws 37 and 37a are first released or turned so as to unlock the gauge rods 30 and 30a. The fitter is then placed exactly on the spot of the instrument where the feet of the bridge will be set. The fitter is then pressed downwardly until the legs 12 and 13 engage the face of the instrument, whereby the gauge rods 28 and 29 will lift or flex the center portion of the spring steel strips 20 and 21 to the exact contour of the instrument top. The side locking screws 39 and 39a are then tightened and the fitter is laid on a perfectly flat solid surface. The back face of the unfitted bridge 40 is also laid on a flat surface with the feet 41 and 42 disposed relative to the fitter in the same relation thereto as the bridge assumes when on the instrument. That is, the first string foot would face the first string side of the fitter. The feet 41 and 42 of the bridge 40 are then brought into engagement with the sanding grit on the curved outer face 21a of the steel strip 21 and the bridge is then rubbed forwardly and backwardly over the sanding grit until the feet are sanded down to a perfect fitting thereon, as shown in FIG. 4, wherein the lower surfaces 43 and 44 of the feet have been shaped to the contour of the instrument. If the feet of the unfitted bridge are unusually thick they may be approximately shaped to the desired contour with a knife or file with the balance to be removed by sanding with the fitter to the perfect shape.

Experience has shown that the bridge fitter of the present invention is an efficient and time saving device and one which provides an accurate means for fitting a bridge to a string instrument. While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A fitter for fitting the feet of a stringed musical instrument bridge to the top curved surface of a stringed musical instrument, comprising: a body having a cross piece and an integral leg at each end thereof extending above and below the same; a resilient means provided with sanding grit on the outer surface thereof mounted between the upper ends of said legs; a pair of laterally spaced apart gauge rods adjustably mounted through said cross piece and having the upper ends thereof disposed to engage said resilient means and the lower ends thereof disposed to engage the top curved surface of a stringed musical instrument when the fitter is placed thereon so that the resilient means is flexed to a contour identical to the top curved surface of the stringed musical instrument; and, locking means for releasably locking said gauge rods in the adjusted positions when the fitter is mounted on a stringed musical instrument.

2. A fitter for fitting the feet of a stringed musical instrument bridge to the top curved surface of a stringed musical instrument, comprising: a body having a cross piece and an integral leg at each end thereof extending above and below the same; a resilient means mounted between the upper ends of said legs; a pair of laterally spaced apart gauge rods adjustably mounted through said cross piece and having the upper ends thereof disposed to engage said resilient means and the lower ends thereof disposed to engage the top curved surface of a stringed musical instrument when the fitter is placed thereon so that the resilient means is flexed to a contour identical to the top curved surface of the stringed musical instrument; locking means for releasably locking said gauge rods in the adjusted positions when the fitter is mounted on a stringed musical instrument; and, said resilient means being provided with a sanding grit on the outer surface thereof, whereby the feet of a bridge may be sanded to the contour of the top curved surface of the stringed musical instrument.

3. A fitter for fitting the feet of a stringed musical instrument bridge to the top curved surface of a stringed musical instrument, comprising: a body having a cross piece and an integral leg at each end thereof extending above and below the same; a resilient means provided with sanding grit on the outer surface thereof mounted between the upper ends of said legs; a pair of laterally spaced apart gauge rods adjustably mounted through said cross piece and having the upper ends thereof disposed to engage said resilient means and the lower ends thereof disposed to engage the top curved surface of a stringed musical instrument when the fitter is placed thereon so that the resilient means is flexed to a contour identical to the top curved surface of the stringed musical instrument; each of said gauge rods being slidably mounted through a vertical hole in said cross piece; said cross piece being provided with a transverse hole intersecting said vertical hole and having a locking pin slidably mounted in the transverse hole; said locking pin having a vertical hole through which the gauge pin is slidably mounted; and, a screw means threadably mounted in the outer end of the locking pin for moving said pin to bind the gauge pin against one side of said vertical hole and lock it in an adjusted position.

4. A fitter for fitting the feet of a stringed musical instrument bridge to the top curved surface of a stringed musical instrument, comprising: a body having a cross piece and an integral leg at each end thereof extending above and below the same; a resilient means mounted between the upper ends of said legs; a pair of laterally spaced apart gauge rods adjustably mounted through said cross piece and having the upper ends thereof disposed to engage said resilient means and the lower ends thereof disposed to engage the top curved surface of a stringed musical instrument when the fitter is placed thereon so that the resilient means is flexed to a contour identical to the top curved surface of the stringed musical instrument; each of said gauge rods being slidably mounted through a vertical hole in said cross piece; said cross piece being provided with a transverse hole intersecting said vertical hole and having a locking pin slidably mounted in the transverse hole; said locking pin having a vertical hole through which the gauge pin is slidably mounted; a screw means threadably mounted in the outer end of the locking pin for moving said pin to bind the gauge pin against one side of said vertical hole and lock it in an adjusted position; and, said resilient means being provided with a sanding grit on the outer surface thereof, whereby the feet of a bridge may be sanded to the contour of the top curved surface of the instrument.

References Cited in the file of this patent

UNITED STATES PATENTS

| | | |
|---|---|---|
| 2,060,266 | Thompson | Nov. 10, 1936 |
| 2,491,991 | Lundback | Dec. 20, 1949 |
| 2,618,913 | Plancon et al. | Nov. 25, 1952 |
| 2,723,506 | Paynton | Nov. 15, 1955 |